United States Patent [19]

Peters et al.

[11] 4,284,595

[45] Aug. 18, 1981

[54] ORIENTATION AND DEPOSITION OF FIBERS IN THE MANUFACTURE OF FIBERBOARD

[75] Inventors: Thomas E. Peters, Boise, Id.; Joseph S. Bleymaier, Columbia, Md.

[73] Assignee: Morrison-Knudsen Forest Products Company, Inc., Boise, Id.

[21] Appl. No.: 4,857

[22] Filed: Jan. 19, 1979

[51] Int. Cl.$^3$ .......................... B29J 5/00; B29C 27/00
[52] U.S. Cl. ....................................... 264/24; 19/296; 156/62.2; 156/272; 264/108; 264/109; 425/83.1; 425/174.8 E
[58] Field of Search ................. 264/24, 108, 109, 122; 19/144, 150, 296; 425/83.1, 174.8 E; 156/62.2, 272

[56] References Cited

U.S. PATENT DOCUMENTS

| | | | |
|---|---|---|---|
| 2,288,072 | 6/1942 | Collins | 264/122 |
| 2,466,906 | 4/1949 | Miller | 264/24 |
| 2,711,626 | 6/1955 | Oglesby | 57/58.89 |
| 2,822,024 | 2/1958 | Himmelheber et al. | 264/109 |
| 2,917,787 | 12/1959 | Thomas | 19/155 |
| 2,920,679 | 1/1960 | Sittel | 264/24 |
| 2,998,051 | 8/1961 | Sittel | 264/24 |
| 3,082,134 | 3/1963 | Hjelt | 220/83 |
| 3,497,419 | 2/1970 | Winer et al. | 260/239.55 D |
| 3,843,756 | 10/1974 | Talbott et al. | 264/24 |
| 3,898,026 | 8/1975 | Sauer et al. | 264/24 |
| 3,954,364 | 5/1976 | Talbott et al. | 425/174.8 |
| 4,045,528 | 8/1977 | Urmanov | 264/69 |
| 4,058,201 | 11/1977 | Etzold | 198/382 |
| 4,060,360 | 11/1977 | Tapp | 425/83.1 |
| 4,063,858 | 12/1977 | Axer et al. | 425/81 |
| 4,111,294 | 9/1978 | Carpenter et al. | 264/24 |
| 4,113,812 | 9/1978 | Talbott et al. | 264/24 |

FOREIGN PATENT DOCUMENTS 816285  7/1959  United Kingdom.

OTHER PUBLICATIONS

Talbott, "Electrically Aligned Particleboard and Fibreboard", Eighth Wash. State Univ. Symposium, Mar. 1944.

Talbott, "Control of . . . Properties of Dry-Formed Lignocellulose Composition Boards by Electrical Fiber Alignment", Washington State U (1975).

Talbott et al., "Aligning Forces on Wood Particles in an Electric Field", Wood and Fiber (Fall 1972), pp. 193-203.

Maloney, "Modern Particleboard and Dry Process Fibreboard Manufacturing", pp. 98-99, 134-135, 164-165 and 212.

*Primary Examiner*—W. E. Hoag
*Attorney, Agent, or Firm*—Shanley, O'Neil and Baker

[57] ABSTRACT

Continuous-line methods and apparatus for orientation and uniform deposition of fibers to enhance directional properties in and production rates of fiberboard produced from lightweight fibrous furnish.

A plurality of elongated rod electrodes are predeterminedly spaced over the area of fiber deposition to establish an electric field exerting a torque on discrete fibers tending to orient longitudinal axes of the fibers in the plane of the mat being formed and aligned with the machine forming direction for such mat. Placement of the rod electrodes and controlled rotation about their longitudinal axes yield a combination of electrical and mechanical forces to provide desired orientation and uniformity of deposition over the full area of deposition.

Directional properties measured in the compacted and cured fiberboard establish that effective orientation ratios of longitudinal axes of fibers in the preferred direction of 1.2:1 and higher are made available working with lightweight fibrous wood material refined under steam pressure and are available at production rates which are commercially economic.

15 Claims, 5 Drawing Figures

ORIENTATION AND DEPOSITION OF FIBERS IN THE MANUFACTURE OF FIBERBOARD

This invention relates to fiberboard manufacture and, more particularly, to orientation and deposition of fibers in continuous-line formation of fiberboard having physical properties that are stronger in one direction.

Particleboards made from wood flakes, chips, and the like have been largely limited to floor underlayment or furniture core uses. However, wood materials used for structural purposes take into consideration inherent directional properties of wood in its various levels of organization to provide adequate strength to handle long-term loads under a variety of conditions.

Sawn lumber in its various structural uses takes advantage of the orthotropic nature of wood. However, sawn lumber utilizes only a fraction of the forest resources; a significant portion remains as residual. Some of the residual may be converted to pulp and paper or comminuted wood panel product.

In the manufacture of panel product, wood particles have been assembled in a random fashion due to the nature of the processes used. However, the properties of a comminuted wood panel can be greatly affected by orientation of elongated wood particles in a preferred direction. As the degree of orientation increases, the panel properties exhibit more of the orthotropic properties of lumber because of better alignment of the longest dimension of such wood particles with the grain direction.

Methods and apparatus have been advanced for use in alignment of certain wood particles. However, the particulate furnish produced from selected cellulosic raw materials by attrition in disc refiners using heat or steam at atmospheric or elevated pressures is difficult to handle and orient properly. It is light in weight, about one pound to about four pounds per cubic foot, with the bulk of the furnish comprising extremely fine, hair-like fibers. It has not been practicable when working with such lightweight fibrous furnish to obtain desired levels of fiber orientation and uniformity at commercially economic production rates with prior art methods and apparatus. Lightweight fibrous furnish, or lightweight furnish with elongated fibers, as used herein, is intended to refer to furnish the bulk of which has the above characteristics.

Orientation chambers have been equipped with electrically charged walls, and/or partitions, arranged in vertically perpendicular relationship to a horizontal deposition surface, for electrostatic orientation purposes. However, charged fibers adhere to such planar electrodes and protrude such that build-up occurs. This build-up eventually reaches a point where the mass becomes too great and random avalanching onto the mat surface occurs. As a result, neither the appearance of, nor the weight distribution in, the mat is uniform.

The present invention eliminates these and other drawbacks and disadvantages of the prior art in providing desired orientation of fibers and uniformity of deposition at production rates which are commercially economic.

In accordance with the invention, elongated electrically conductive rods are placed in the flow path of the lightweight furnish, contiguous to the surface of the mat being formed and, are controllably rotated. Fibers, presented in individualized form, are attracted toward the rods and the mat being formed; orientation and deposition of the fibers are controlled by a combination of electrical and mechanical forces.

Those fibers which are electrically attracted to the rods adhere in spoke-like fashion to the rods. Rotation of the rods and movement of the mat forming surface are controlled so as to brush the fibers against the mat surface presented. Contact with the mat surface and centrifugal force created by rotation of the rods breaks the electrical adhesion to the rods and the fibers are deposited in a controlled manner to help attain a desired orientation ratio.

In addition, control of electrical polarity and the placement of the rods establish an electric field with lines of force extending in the machine-forming direction and substantially parallel to the forming surface on which the furnish is deposited. This electric field exerts a torque on the fibers approaching and falling between the rods tending to align axes of the fibers in the direction of movement of the mat forming surface and parallel to that surface.

Other advantages and contributions are set forth in a more detailed description of the invention based on the accompanying drawings, in which.

In the handling of the lightweight furnish before fiber orientation, the furnish is metered, distributed and separated into discrete fibers as it approaches the orientation and deposition apparatus. In the continuous-line apparatus for manufacture of fiberboard shown in FIG. 1, a furnish supply 10 is located in vertically spaced relationship above a forming conveyor 11 presenting web 12 on which a mat of the fibrous material is to be formed. From furnish supply 10, the furnish descends into distribution means 14 for distribution transverse to the direction of movement of furnish toward web 12; e.g. distribution means 14 imposes a substantially uniform distribution of furnish over a distance correlated to the lateral dimension of the board measured in the plane of the board perpendicularly to the machine forming direction.

Figure 1:
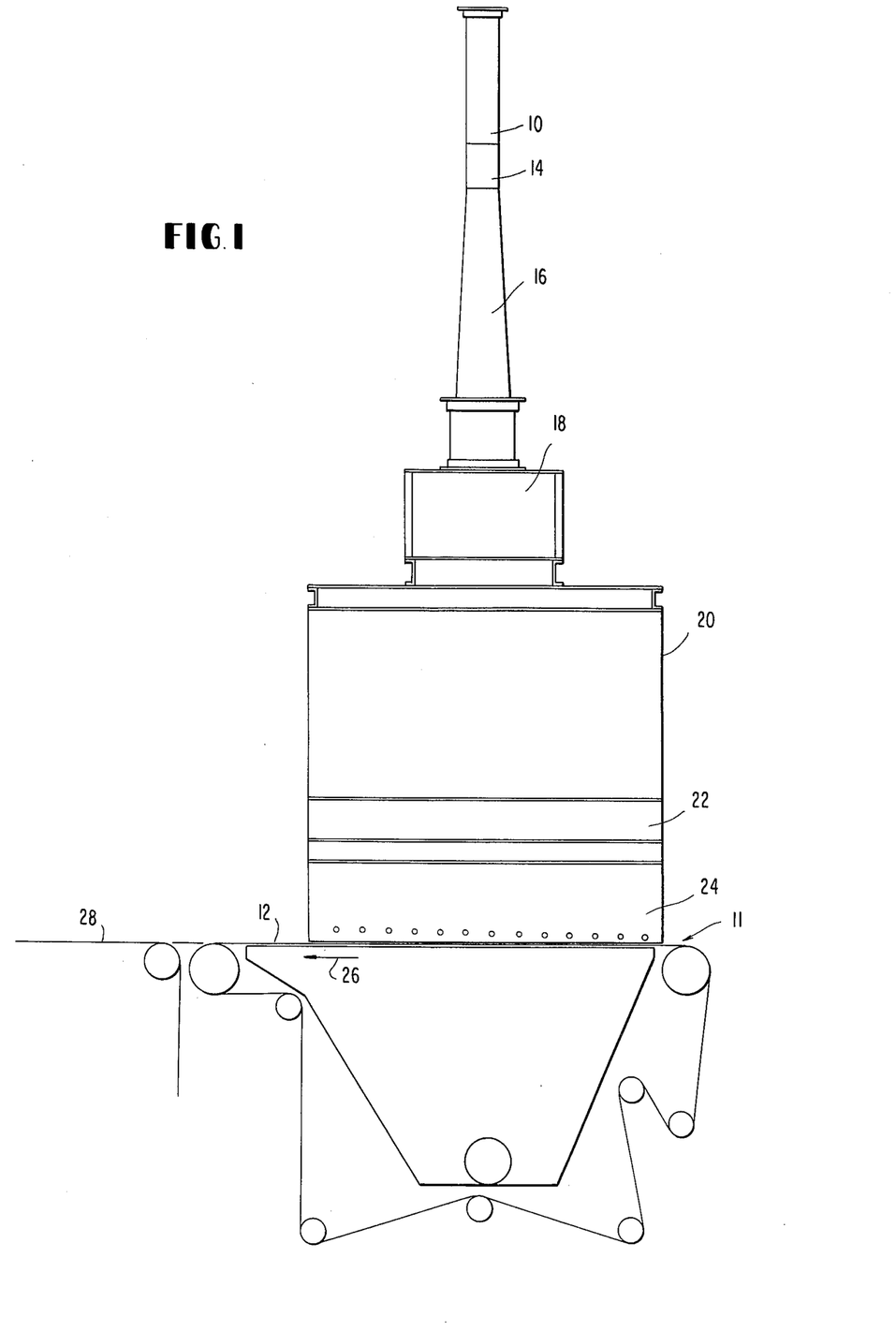
FIG. 1 is a schematic view of apparatus for continuous-line manufacture of fiberboard in accordance with the present invention.

The laterally distributed furnish is accumulated in a feed chamber 16 and moved forward toward the web 12 by metering means 18. The metered furnish is distributed, in the direction of web travel, by longitudinal distribution means 20 over a preselected dimension which, with the established lateral dimension, determines the area of deposition of the mat forming fibrous material.

The furnish, substantially uniformly distributed over the preselected area for deposition, moves in the direction of the web 12 through fiber separation means 22. Fiber clusters are broken up into discrete fibers by passage through the fiber separation means 22 as the furnish is delivered in the direction of web 12.

Furnish feed, distribution, metering, and fiber separation means are provided to deliver furnish at a suitable production flow rate over the area of deposition, with the discrete fibers moving in the direction of the mat forming surface substantially free of air turbulence effects. One example of novel handling procedures and combinations of apparatus for providing such delivery of furnish is described in greater detail in companion application Ser. No. 4,858, entitled "Furnish Handling Methods and Apparatus," filed concurrently herewith and assigned to the assignee of the present application.

In accordance with the present invention, the fibers move through an open-ended flow-through chamber 24 for orientation and deposition; the web 12 is moving in a continuous manner in the machine forming direction, as indicated by arrow 26 under the control of guide and drive roll means. The mat formed on the continuous web 12 then moves onto conveyor 28 for transfer to a press; typically, the mat is subjected to heat and pressure which will polymerize a binder system at the same time the mat is compressed into desired board density.

The furnish is moved through the orientation and deposition chamber 24 substantially free of pneumatic turbulence which would have an undesirable effect on orientation. The electrical forces imposed by energizing the rod electrodes in chamber 24 tend to orient the fibers in the plane of the fiberboard mat and with longitudinal axes of the fibers substantially aligned with the forming direction. The present invention teaches the use of a combination of electrical and mechanical forces to achieve desired orientation and substantially uniform deposition over the predetermined area.

Figure 2:
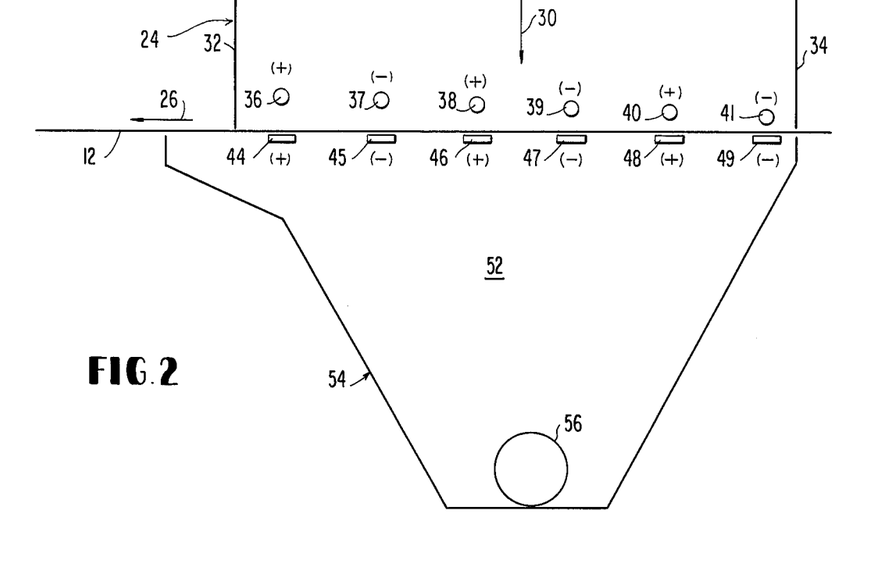
FIG. 2 is a schematic view in cross-section, taken along the machine forming direction, of orientation and deposition apparatus of the present invention.

Referring to FIG. 2, the orientation and deposition chamber 24 includes guide walls defining an open-ended flow-through structure into which the furnish is moving as indicated by arrow 30. The guide walls of the flow-through chamber define the area of deposition. Referring to the direction of movement of web 12 indicated by arrow 26, guide wall 32 is located at the leading end of the area of deposition and guide wall 34 is located at the trailing end of the area of deposition.

In accordance with the invention, desired orientation is carried out uniformly over the full area of deposition. A plurality of electrically conductive rods 36 through 41 are selectively positioned and supported in close proximity to web 12. Rods 36 through 41 are elongated with their longitudinal axes disposed in transverse relationship to the forming direction and parallel to the deposition area. Electrical polarity of the rods is selected; in the preferred embodiment, the rods 36 through 41 are electrically charged so that, at any instant, each next adjacent rod is of opposite polarity; for example, rod 36 is connected to be of positive polarity while rod 37 is connected to be of negative polarity.

The electrically charged elongated rods 36 through 41 are predeterminedly spaced above web 12 in the direction of approach of furnish. Each rod is contiguous, i.e. adjacent, to the mat forming surface on web 12 with the predetermined spacing of the rods from the surface of web 12 taking into account the increasing thickness of the mat as the web 12 travels longitudinally toward the leading end of the structure 24. Therefore, rods located near the leading end of the area of deposition in structure 24 will be spaced a greater distance above the support surface of the web 12 of the transport conveyor than those at the trailing end of the area of deposition. The contiguous relationship of the peripheral surface of the rods and the exposed surface of the mat being formed remains substantially the same regardless of the depth of the mat.

Web 12 of the forming conveyor can comprise a continuous foraminous belt woven from nylon or similar material. Part of the teachings of the invention include support and electrical contact of the subsurface of web 12 with electrical conductor bars 44 through 49. Such bars are elongated with their longitudinal axes extending in transverse relationship to the direction of movement of web 12. Preferably these bars present a flat surface for support of the web. In the array shown, such bars are connected so that each next adjacent bar, at any instant, is of opposite polarity; for example, bar 44 is positive and bar 45 is negative, etc.

Although web 12 is essentially non-conductive, the voltage level is such that a small current is established through the fiber mat and the forming belt. Dielectric properties of the mat may vary depending on the moisture content of the fibrous materials or additives to the furnish. The effect of mat current is to hold the fibrous material to the web and maintain desired alignment of fibers. Selective control of instantaneous polarity of the subsurface electrical conductor bars is provided along with selective placement in relation to the separate electric field producing rods above the web.

Also, as shown in FIG. 2, a chamber 52 may be positioned subsurface of the web 12. As defined by wall structure 54, chamber 52 can extend over the full area of deposition. A fan means 56 of any suitable design can be connected to chamber 52 to help prevent random escape of dust. A representative negative pressure level would be about one quarter inch of water (0.25 inch of water vacuum). This slight negative pressure may be used to conveniently reduce ambient dust about the structure without causing air turbulence forces in the flow-through chamber 24 which would adversely affect desired orientation of fibers. Orientation ratios can be reduced below desired levels at greater negative pressures.

Figure 3:
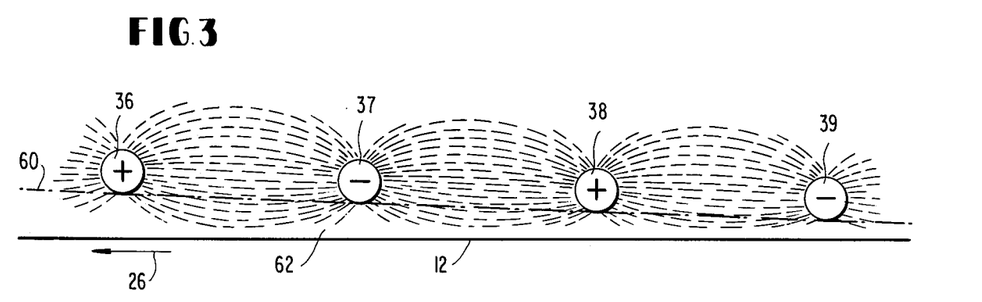
FIG. 3 is a schematic representation in cross section along the machine forming direction of the electric field of the present invention.

FIG. 3 is an enlarged view of a portion of FIG. 2 showing the electrical field generated by charged rods 36 through 39 in predeterminedly spaced relationship above web 12. By use of opposite polarities in next adjacent rods 36 through 39, the field strength between the rods is increased to the algebraic sum of the voltages established in each rod. The on-site voltage available for these rods has an effect in selecting longitudinal spacing, i.e. along the mat forming direction. Higher voltage potentials permit greater longitudinal spacing between the rods.

The electric field includes lines of force extending substantially horizontally between the rods. For example, in a plane through the mid-points of rods 36 and 37, electric field lines of force extend parallel to the mat forming surface in the forming direction. Above and below these center-plane lines of force, between the adjacent electrically conductive rods, electric field lines of force arch slightly, as indicated, while maintaining alignment with the forming direction with a major component of the lines of force in parallel relation to the mat forming surface.

Figure 4:
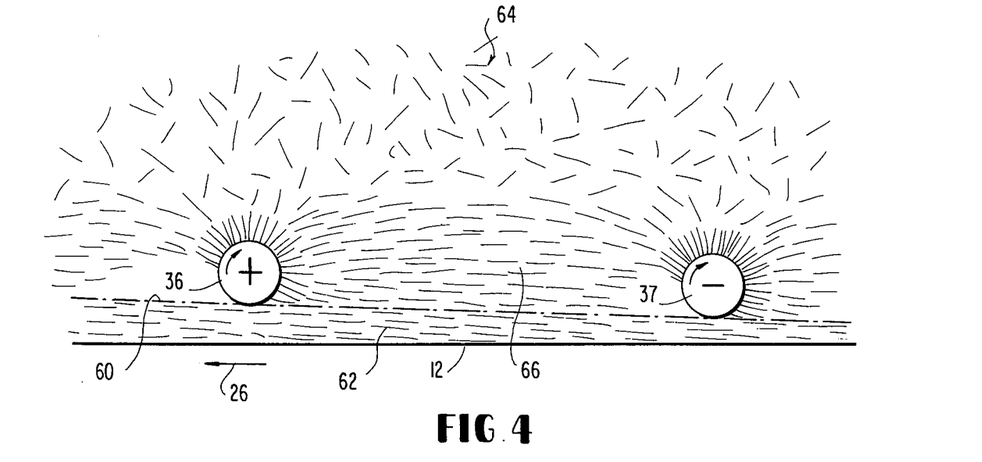
FIG. 4 is a schematic representation in cross section along the machine forming direction of the effect of the electric field of the present invention on fibrous material.

The effect of the electric field generated by rotating rods of the present invention on discrete fibers moving in the direction of mat 12 is represented in FIG. 4 which is an enlarged view of a portion of FIG. 2. Mat forming surface 60 is presented by the mat 62 being formed on web 12; next adjacent rods 36 and 37 are of opposite polarity with rod 36 being positive and rod 37 being negative.

Fibers descend from upper portions of the flow-through chamber 24 along a flow path which is substantially normal to the web 12. In area 64, approaching the effective electric field, the fibers are randomly oriented with axes of individual fibers in any of three dimensions; that is, individual fibers may be descending with their longitudinal axes at any angle between substantially normal to the plane of the web or substantially parallel to the plane of the web and also with their longitudinal axes at any angle between alignment with the direction of movement of the mat and 90° to that direction.

Fibers which are attracted to and adhere to the electrically charged rods are radially disposed in spoke-like fashion about each rod. This disposition of fibers adhering to the rods can be extended in length. Such fiber "whiskers" include fibers adhering to and extending longitudinally from a first tier of fibers in contact with the rods. As the rods rotate, in the direction shown, through the upper quadrants and through the quadrant approaching the web forming surface, these spoke-like protrusions of fibers become extended in length and closely adjacent. As the rotating rods take these adhering fibers through the final quadrant approaching the web 12, the fibers contact the mat forming surface 60. Both the rotational centrifugal force and the continued rotation of the rods which causes fiber contact with the mat forming surface 60 contribute to the breaking of the electrical attraction of the spoke-like fibers to the rods; these fibers are deposited with preferred direction orientation in the plane of the mat.

The direction of rod rotation is such that a rod, and its adhering fibers, appear to "climb" the mat as it moves in the direction shown. The rods are positioned so that the bottom peripheral surface of each rod is contiguous to the surface of the mat being formed; because of attraction to the energized rods, the web 12 may be lifted slightly as it travels under a rod. The contiguous relationship clears fibers from the rods so that a portion of the first quadrant of a rod, after passage of its closest point to the mat surface, is initially free of fibers. The r.p.m. of the rods is selected to maximize orientation and avoid any build-up of fibers on the rods.

In addition to those fibers adhering to the rods, fibers falling toward and between the rods are acted upon by the electric field generated by the rods tending to orient fibers with their axes substantially parallel to the plane of the mat being formed and with their longitudinal axes in substantially the same direction as the direction of movement of web 12; such orientation is represented by the fibers in portion 66 of the chamber structure 24.

The subsurface electrical means, bars 44-49 as shown in FIG. 2, help maintain a separate electric force in the mat being formed by establishing a slight current in the mat.

Figure 5:
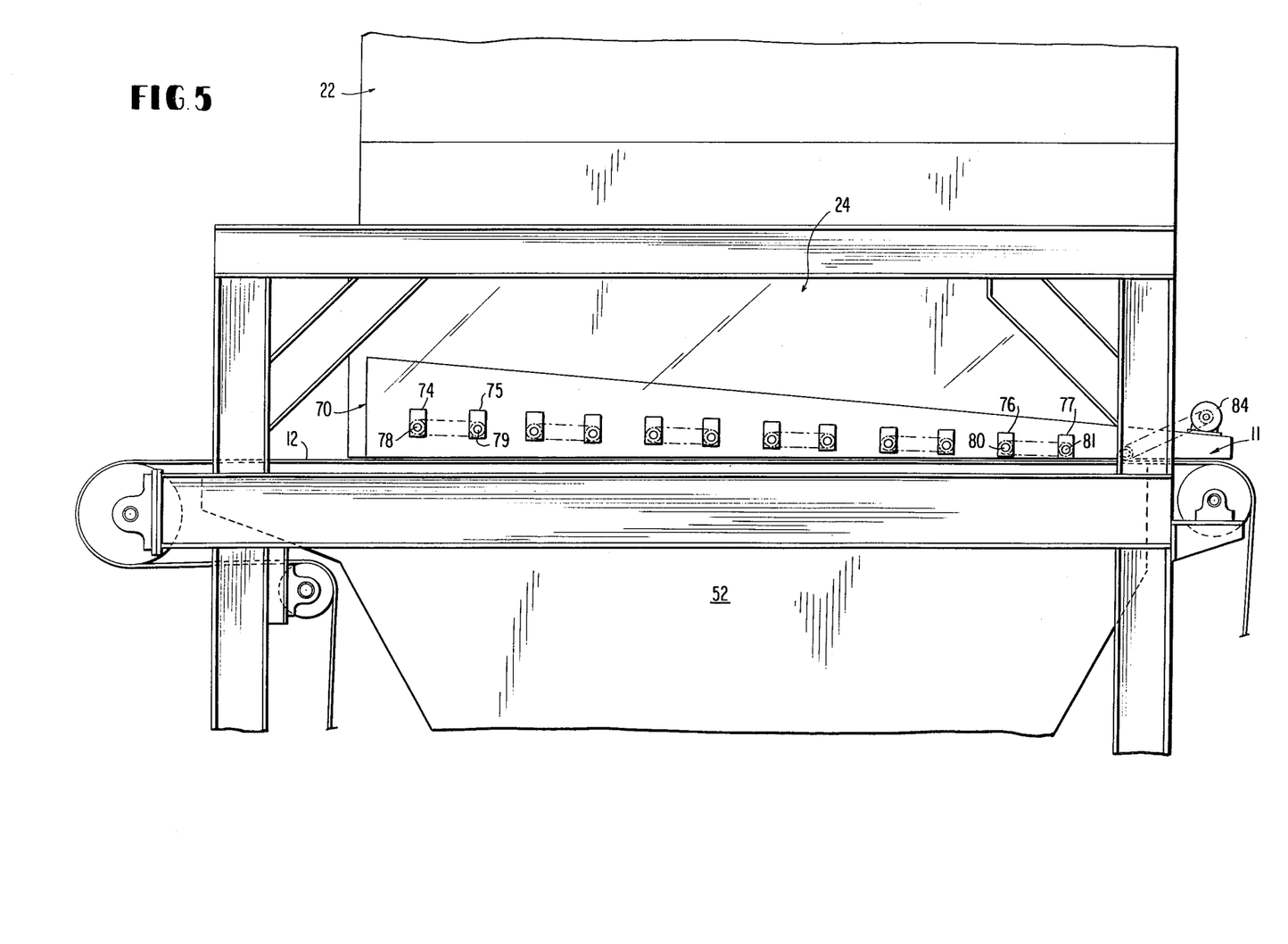
FIG. 5 is a view in elevation showing structure for placement and rotation of the electrostatic field producing means of the present invention.

Means for positioning, rotating, and electrically connecting the elongated electrically conductive rods are shown in FIG. 5. In this embodiment, a support frame 70 extends in the machine forming direction along opposite sides of the forming chamber 24. Support frame 70 holds the mounting and electrical contact bearings, e.g. 74, 75 at the leading end and 76, 77 at the trailing end, for the axles 78, 79 and 80, 81, respectively, of the rods. As shown, the spacing between the web 12 and the rod axes increases in the direction of movement of web 12. Drive means 84 provides for controlled rotation of the rods.

Additional teachings which can be utilized to enhance fiber orientation at increased production rates while maintaining consistent results include: maximizing the electrostatic field strength while avoiding arching, providing for maximizing the effect of the field strength including monitoring moisture content of the fibers and addition of materials to effect physical properties of the fibers such as electrical conductivity, selection of the quantity, type, and state of binder resin included in the furnish, control of speed of rotation and size of the electrically conductive rods for producing the electric field, and control of the longitudinal movement of the conveyor support belt for the mat being formed.

The invention finds special application in working with lightweight fibrous materials. The pressure refined wood furnish on which data is presented below had presented special problems to the prior art in obtaining desired orientation and commercial production rates. The wood is broken down closer to individual fibers in a pressurized steam refiner than what is available from atmospheric attrition mill conditions. Various refining processes for preparing lightweight fibrous furnishes are known in the art (see e.g. "Modern Particleboard and Dry Process Fiberboard" by Thomas M. Maloney, pp. 98, 99, 212).

A predominant part of the bulk of pressurized steam refined wood furnish comprises extremely fine, hair-like fibers which can be less than a mil in diameter. These hair-like fibers can vary in length up to as much as three-fourths inch but are predominantly about one-quarter to about one-half inch in length. A tendency to cluster exhibited by the furnish, similar to that observed with cotton fibers, results from the nature of these extremely fine hair-like fibers. A significant percentage by weight of such pressurized disc refined furnish comprises heavier, elongated splinter-like pieces of wood having diameters up to about two mils. Some of these exhibit fiber-like qualities being longitudinally pliable while others are more rigid. The balance of the weight of such furnish comprises dust-like particles.

With the teachings of the present invention, field strengths established by the rotating rods exhibiting voltage gradients of 2,500 to 10,000 volts/inch provide suitable orientation conditions (the voltage gradient in volts per inch is equal to the positive polarity voltage at any instant supplied to an electrode plus the negative polarity voltage supplied at that instant to an adjacent electrode divided by the distance between the electrodes). The voltage supply can be conventional; while AC or DC can be operational, DC is preferred because of better fiber orientation results. The voltage gradient should stay below the point where arcing can take place. The voltage gradient where arcing can take place in air varies from about 12,000 to about 17,000 volts/inch, depending on the relative humidity. Also current leakage increases more rapidly at field strengths above 10,000 volts/inch. A typical voltage gradient when working with lightweight furnish is about 8,000 volts/inch.

Control of rod spacing along the machine forming direction of the electrically charged rods above the web is partially dependent on the high voltage power supply connections. The field strength can be increased by utilizing two voltage power supplies of opposite polarity connected to adjacent rods. With 50,000 volt D.C.

power supplies and eight and one-half inch spacing between the rods in the machine forming direction, a voltage gradient up to about 12,000 volts/inch can be achieved. The voltage output of the power supply is adjustable. With lower voltage output capability, the spacing between the rods can be reduced to maintain the desired voltage gradients. Orientation ratio increases gradually in a substantially linear fashion as the voltage gradient increases using the teachings of the present invention.

Within the above range of values, rod diameter of about three quarters of an inch provides optimum orientation results. Smaller or larger diameter rods, e.g. from about one-half inch to an inch, can be used. However, use of rods of one and one-quarter inch, and larger, can result in lower orientation ratios with the lightweight wood furnish described. The nature of the rod metallurgy has little effect as long as the rod is a good conductor. Rod rotation, with the lightweight furnish described, is controlled in the range of about 100 to 300 r.p.m.

The improved orientation ratios and production rates of the present invention are made available over a significantly wider range of moisture contents of the lightweight pressure refined furnish than what was previously considered practical with planar electrodes of the wall and partition type. For example, improved orientation ratios are available with moisture contents from about 5% to about 15% by weight. This significantly increases permissive selectivity available in the furnish and in the resin binder system used while maintaining consistency of results. With the chamber wall and partition type of electrodes of the prior art, the range of moisture contents of the furnish which could be used was more restricted; little orientation effect could be produced when the moisture content varied below an optimum percentage; e.g. 15% or higher moisture contents were generally considered to be better suited for obtaining orientation.

In practice of the present invention, moisture contents in the range of about 7½% to about 10% are preferred although desired orientation ratios can be achieved over a much wider range of moisture contents. It has been found, however, that as moisture content approaches 20%, adhesiveness or so-called "tack level" of certain resins can interfere with proper mat formation. Moisture content of the furnish, using conventional measuring means, can be monitored for better selection of electric field strength. Moisture content monitoring means can be mounted along the furnish handling line to activate a water spray solenoid valve to hold moisture content during periods when very low moisture content is exhibited by the particular furnish.

In practice, a variety of suitable binder systems exist which do not significantly inhibit achievement of proper orientation. Resin types include urea formaldehyde, phenol formaldehyde, isocyanate, and tannin formaldehyde. The resins can be applied in powder or liquid form. Percent of resin may typically run from about 4% to about 10% by weight of the dry fiber depending on the application and the product. Some liquid resins, such as urea formaldehyde, may cause tack and consequent clumping or balling of the fibers. Lower tack resins can be selected to avoid problems which could interfere with proper alignment and uniform deposition.

The effect of the electric field on the furnish can be modified, e.g. by controllably adding a salt, which enhances conductivity, to the fibrous material in order to improve orientation ratios. When the manufacturing process requires very low moisture contents, inclusion of a salt, such as sodium chloride, is beneficial. However, for most applications, the moisture content preferred in the particular fiberboard manufacturing process provides adequate conductivity for desired orientation when using the present invention.

While numerous factors can enter into evaluating characteristics of directionality in fiberboard, bending stiffness, also referred to as the modulus of elasticity in bending, providing a convenient measure of effective fiber orientation ratio achievement. Methods and means for measurement of the properties of oriented particleboard are known in the art; see e.g. "Electrically Aligned Particleboard and Fiberboard," by John W. Talbott, presented at the Eighth Washington State University Symposium on Particleboard of March 1974, which is included herein by reference.

With random orientation, the ratio of particles in the "X" direction (direction of forming) to the number of particles in the "Y" direction (perpendicularly transverse to the direction of forming) is one to one. With fiber orientation in the direction of forming, this ratio increases. The index of the degree of orientation achieved with fibers is based on the ratio of the modulus of elasticity in the machine forming direction ($E_x$) to the modulus of elasticity in the cross machine direction ($E_y$). Ratios ($E_x/E_y$) of 1.2:1 and higher are achieved through use of the present invention with pressure refined wood furnish which has been considered the most difficult to handle of the lightweight furnishes described.

It has been demonstrated that the present invention is capable of providing desired orientation ratios with the lightweight furnish, produced by pressurized refining, at economically acceptable production rates over commercially practical forming areas. For example at an 18,000 lbs. per hour flow rate of furnish made available by the furnish handling and distribution invention of the above-identified application Ser. No. 4,858, electric field fiber orientation to desired ratios can readily be achieved with the present teachings when depositing fibers from one to above five lbs. per square foot per minute over a deposition surface of about seventy-five (75) square feet.

With a flow rate of about 300 lbs. per minute and a deposition area of about seventy-five square feet, fiberboard having a fifty (50) lb. per cubic foot density and a one-eighth inch thickness after curing can be formed with desired orientation ratios at the rate of fifty (50) linear feet per minute. When the final thickness desired is one-fourth inch, such fiberboard can be produced at twenty-five (25) linear feet per minute. In practice, the actual deposition rate of the dry fiber exceeds such figures since pre-cured deposition of furnish will ordinarily be in excess of press capacity. For purposes of more efficient handling and more uniform distribution of fibers, the furnish is provided, distributed, oriented, and deposited at an optimum rate and, where the deposition exceeds press capacity, a portion of the mat can be shaved off prior to entry into the curing press and returned to the furnish supply and distribution line.

While specific structure, physical characteristics, and dimensional values have been set forth for purposes of disclosing a specific embodiment, it should be recognized that, in the light of the above disclosure, modifications within the scope of the invention will be available to those skilled in the art. Therefore, in determining the scope of the invention, reference shall be had to the appended claims.

We claim:

1. Continuous-line method for orienting and depositing lightweight furnish, including fibrous material with curable binder, in the manufacture of fiberboard having directional properties, comprising the steps of providing a web presenting an extended surface area for deposition of furnish, moving such web continuously to establish a forming direction, providing lightweight furnish including elongated fibers moving along a flow path which is substantially normal to such surface for deposition of furnish, guiding such furnish in the direction of such web, orienting and depositing fibers with preferred orientation utilizing electrical and mechanical forces by disposing a plurality of elongated electrically conductive rods in spaced relationship from each other along such forming direction and in predetermined adjacent relationship above the web, with longitudinal axes of such elongated rods being in transverse relationship to the forming direction, establishing electrical potential in such rods to attract fibers to such rods and establish an electric field which exerts a force on fibers moving toward the web tending to orient longitudinal axes of such elongated fibers in parallel relationship to the plane of the mat being formed and aligned with the forming direction, and controllably driving the elongated electrically charged rods to rotate such rods about their respective axes to deposit fibers adhering to such rods by contact of such fibers with a mat forming surface presented by such web.

2. Method for orienting and depositing lightweight furnish in the manufacture of fiberboard having enhanced directional properties, comprising the steps of providing a web presenting an extended surface area for deposition of furnish, providing lightweight furnish including elongated fibers, guiding such furnish in the direction of such web, and orienting such fibers and depositing such furnish over such predetermined surface area by disposing elongated electrically conductive rods in predetermined spaced relationship to each other over such preselected surface area, such rods being located above such predetermined surface area in the direction of approach of such fibers in adjacent relationship to such predetermined surface area, establishing electrical potential in such rods to establish an electric field which exerts a force on fibers moving toward the web tending to directionally orient longitudinal axes of the fibers with respect to such surface area and to attract individual fibers to the elongated electrically charged rods such that fibers adhering to such rods extend in substantially radial relationship to respective longitudinal axes of such rods, and controllably driving the elongated rods to rotate such rods about their respective longitudinal axes such that fibers adhering to such rods are brought into contact with a mat forming surface presented by such web to break such electrical attraction to the rods and deposit such fibers with preferred directionality on such surface.

3. Method for orientating and depositing lightweight furnish, including fibrous material with curable binder, in the manufacture of fiberboard having enhanced directional properties, comprising the steps of providing a web presenting an extended surface area for deposition of furnish, such web having a longitudinal axis and a lateral dimension measured perpendicularly to such longitudinal axis, the lateral dimension being at least equal to the lateral dimension of the fiberboard being formed, controllably moving such web in the direction of its longitudinal axis, providing lightweight furnish including elongated fibers, such furnish being substantially uniformly distributed with relation to the web over a predetermined surface area having a lateral dimension at least equal to that of the fiberboard being formed and a preselected longitudinal dimension of the web, such uniformly distributed furnish being substantially free of fiber clusters and moving in the direction of the web, guiding such uniformly distributed furnish in the direction of such web through fiber orientation means including guide walls defining an open-ended chamber-like structure having cross-sectional dimensions, measured in a plane perpendicular to the direction of movement of such furnish, correlated with those of the predetermined surface area for deposition of fibers, orienting such fibers and depositing such furnish over such predetermined surface area by disposing elongated electrically conductive rods in longitudinally spaced relationship above such preselected surface area in predetermined adjacent relationship to the web with longitudinal axes of such rods in transverse relationship to the longitudinal axis of the web, such rods extending laterally across the web a distance at least equal to the lateral dimension of the fiberboard being formed and being spaced from the web in the direction of approach of such fibers, establishing electrical potential in such rods to establish an electric field between such rods which exerts a force on fibers moving toward the web tending to orient longitudinal axes of the fibers into parallel relationship with respect to both the plane of the mat being formed and the longitudinal axis of the web, and to attract individual fibers to the elongated electrically charged rods such that fibers adhering to such rods extend in substantially radial relationship to respective longitudinal axes of such rods, and controllably driving the elongated electrically charged rods to rotate such rods about their respective longitudinal axes such that fibers adhering to such rods are brought into contact with a mat forming surface presented by such web to break such electrical attraction to the rods and deposit such fibers in longitudinally preferred oriented relationship on such surface.

4. The method of claim 3 in which movement of the web in the direction of its longitudinal axis establishes a leading end and a trailing end for such area of furnish deposition, including the step of predeterminedly positioning the electrically charged rods above the moving web in the direction of approach of fibers, with spacing above the moving web of rods located toward the leading longitudinal end of such area of fiber deposition being greater than corresponding spacing of rods located toward the trailing longitudinal end to maintain a substantially uniform spacing between respective rods and adjacent mat forming surface being presented by the web in traveling from the trailing longitudinal end toward the leading longitudinal end of the area of deposition.

5. The method of claim 3 including the step of coordinating RPM of such rods with rate of longitudinal movement of the web.

6. The method of claim 3 including controlling electrical potential and polarity in such rods to control electric field strength longitudinally of such web.

7. The method of claim 3 including positioning a plurality of elongated electrically conductive bars subsurface of the web with their longitudinal axes in transverse relationship to the longitudinal axis of the web and distributed longitudinally along the web in contact with the surface of the web opposite to the surface of deposition of furnish, and controllably energizing such subsurface electrically conductive bars to establish a current in the mat being formed.

8. The method of claim 7 including controllably correlating positioning of and electrical polarities in such rods above the web surface and such bars subsurface of the web.

9. Apparatus for use in continuous-line manufacture of fiberboard from lightweight furnish including fine textured elongated fibers and curable binding material, such apparatus providing orientation and uniform deposition of fibers for enhancing directional characteristics of the fiberboard, comprising a forming conveyor including a continuously moving web presenting an extended surface area for deposition of furnish, means for establishing a flow path and delivering such lightweight furnish substantially uniformly distributed over such area of deposition with the fibers in discrete form substantially free of fiber clusters, means located in the flow path of such furnish toward such surface area for deposition for establishing an electric field, such means for establishing an electric field including a plurality of elongated electrically conductive rods mounted for rotation with their longitudinal axes in transverse relationship to the direction of movement of such surface of deposition and in substantially parallel relationship to such surface, such plurality of rods being contiguous to a mat forming surface presented by deposition of fibers on such surface of deposition and being spaced along the direction of movement of such surface of deposition across the flow path of furnish in approaching deposition, such electric field including lines of force tending to align longitudinal axes of such fibers with the direction of movement of the surface of deposition and into substantially parallel relationship with such mat forming surface, drive means for rotating such electrically conductive rods, means for controlling electrical potential of such rods, and means for establishing location of the rods in preselected spaced relationship above such surface of deposition.

10. The apparatus of claim 9 further including a plurality of elongated electrically conductive bars located in subsurface contact with such continuously moving web, the plurality of subsurface elongated electrically conductive bars having their longitudinal axes in transverse relationship to the direction of movement of such web and in parallel relationship to the surface of deposition, and means for establishing electrical potential in such subsurface bars to establish an electric current in such mat being formed on the surface of deposition.

11. Apparatus for use in continuous-line manufacture of fiberboard from lightweight furnish including fine textured elongated fibers and curable binding materials, such apparatus providing desired orientation and uniform deposition of fibers to enhance directional appearance characteristics in the fiberboard being formed, comprising means for delivering lightweight furnish, web means presenting a mat forming surface, such web means including a continuously moving web having a longitudinal axis and a lateral dimension measured perpendicularly to such longitudinal axis and presenting a preselected area for deposition of furnish having a lateral dimension correlated to that of the lateral dimension of the fiberboard being formed, such means for delivering furnish in the direction of such web providing substantially uniform lateral and longitudinal distribution controlled flow of furnish as substantially individualized fibers moving toward such web for orientation and deposition purposes, and orientation and deposition means comprising guide wall means defining a flow-through structure for passage of furnish toward the web, such flow-through structure having cross-sectional lateral and longitudinal dimensions measured transversely to the flow path of furnish, which dimensions are correlated with corresponding dimensions of the preselected area of deposition of the fibers, and a plurality of elongated electrically conductive rods having their longitudinal axes disposed in transverse relationship to the longitudinal axis of such web, such rods extending laterally across such web a distance correlated with the lateral dimension of the fiberboard being formed and being positioned in closely spaced relationship to such web, such closely spaced relationship being preselected in the direction of approach of fibers toward the web, such laterally extending rods being spaced from each other longitudinally in a predetermined manner along the direction of travel of such web, drive means for rotating such plurality of elongated electrically conductive rods about their respective longitudinal axes, and means for electrically energizing such rods to establish an electric field in the flow path of fibers approaching such rods and deposition on such mat forming surface.

12. The apparatus of claim 11 in which such electrically conductive rods are spaced from the mat forming surface presented by the web such that elongated fibers adhering electrostatically to such rods contact the mat forming surface with rotation of such rods.

13. The apparatus of claim 11 in which
such guide wall means define leading and trailing longitudinal ends of such mat forming surface presented for deposition of fibers with electrically conductive rods located toward such leading longitudinal end being spaced a greater distance from such web than rods located toward such trailing longitudinal end.

14. The apparatus of claim 11 including
electrically conductive means subsurface of such web for establishing a current path in furnish deposited on such web.

15. The apparatus of claim 14 in which the electrically conductive means located subsurface of such web comprise
a plurality of elongated electrically conductive bars in contact with the subsurface of the web,
such elongated bars having their longitudinal axes in transverse relationship to the longitudinal axis of the web and spaced from each other along the longitudinal direction of travel of the web in preselected positions correlated with positions of the electrically conductive rods located above the web.

* * * * *